United States Patent
Ghaboosi et al.

(10) Patent No.: US 9,397,800 B2
(45) Date of Patent: Jul. 19, 2016

(54) DUPLEXING IN LONG TERM EVOLUTION (LTE) CELLULAR NETWORKS

(71) Applicant: Broadcom Corporation, Irvine, CA (US)

(72) Inventors: Kaveh Ghaboosi, San Diego, CA (US); Manish Goldie Vemulapalli, San Diego, CA (US); Noel James Oates, La Jolla, CA (US)

(73) Assignee: BROADCOM CORPORATION, Irvine, CA (US)

( * ) Notice: Subject to any disclaimer, the term of this patent is extended or adjusted under 35 U.S.C. 154(b) by 353 days.

(21) Appl. No.: 13/850,973

(22) Filed: Mar. 26, 2013

(65) Prior Publication Data

US 2014/0286205 A1    Sep. 25, 2014

Related U.S. Application Data

(60) Provisional application No. 61/804,093, filed on Mar. 21, 2013.

(51) Int. Cl.
| H04J 4/00 | (2006.01) |
|---|---|
| H04W 72/04 | (2009.01) |
| H04L 5/00 | (2006.01) |
| H04L 5/14 | (2006.01) |
| H04B 7/14 | (2006.01) |
| H04L 1/18 | (2006.01) |

(52) U.S. Cl.
CPC .............. *H04L 5/001* (2013.01); *H04L 1/1854* (2013.01); *H04L 1/1887* (2013.01); *H04L 5/0044* (2013.01); *H04L 5/143* (2013.01); *H04L 5/1469* (2013.01); *H04W 72/0453* (2013.01); *H04L 1/1812* (2013.01); *H04L 5/0035* (2013.01); *H04L 5/0055* (2013.01); *H04W 72/0446* (2013.01)

(58) Field of Classification Search
CPC ..... H04L 5/001; H04L 5/0055; H04L 5/0053; H04L 1/1861
USPC ......................................... 370/329, 330, 431
See application file for complete search history.

(56) References Cited

U.S. PATENT DOCUMENTS

| 2011/0041027 A1* | 2/2011 | Fong ..................... H04L 1/1812 714/749 |
|---|---|---|
| 2011/0243066 A1* | 10/2011 | Nayeb Nazar .......... H04L 1/007 370/328 |
| 2011/0274014 A1* | 11/2011 | Du ........................ H04W 24/02 370/278 |

(Continued)

*Primary Examiner* — Charles C Jiang
*Assistant Examiner* — Will Lin
(74) *Attorney, Agent, or Firm* — Foley & Lardner LLP; Christopher J. McKenna; Paul M. H. Pua (57) ABSTRACT

A duplexing method is provided that combines aspects of Frequency Division Duplex (FDD) and Time Division Duplex (TDD) methods in a network, such as a Long Term Evolution (LTE) network. The duplexing method may be implemented on an existing FDD network by replacing the FDD uplink (UL)-only radio frame with a full TDD radio frame having dynamically allocable UL and downlink (DL) sub-frames. Alternatively, the duplexing method may be implemented on an existing TDD network by adding a second frequency to pair with an existing frequency over which a FDD DL-only radio frame can be run.

20 Claims, 8 Drawing Sheets

(56) References Cited

U.S. PATENT DOCUMENTS

| | | | | |
|---|---|---|---|---|
| 2012/0087254 A1* | 4/2012 | Yin | .................. | H04L 1/0031 370/252 |
| 2012/0106404 A1* | 5/2012 | Damnjanovic | .......... | H04L 5/001 370/279 |
| 2013/0034028 A1* | 2/2013 | Chen | ................ | H04L 1/1854 370/280 |
| 2013/0301401 A1* | 11/2013 | Wang | .................. | H04L 5/001 370/209 |
| 2013/0343239 A1* | 12/2013 | Damnjanovic | .......... | H04L 5/001 370/280 |
| 2014/0036749 A1* | 2/2014 | Wang | .................. | H04W 28/12 370/311 |
| 2014/0086078 A1* | 3/2014 | Malladi | ............... | H04W 72/042 370/252 |
| 2014/0269338 A1* | 9/2014 | Jung | .................. | H04L 5/0055 370/241 |
| 2015/0200762 A1* | 7/2015 | Kim | ................ | H04L 1/1867 370/329 |

\* cited by examiner

DUPLEXING IN LONG TERM EVOLUTION (LTE) CELLULAR NETWORKS

TECHNICAL FIELD

The technical field of the present disclosure relates to wireless communication systems, and more particularly, to combining aspects of Time Division Duplex (TDD) and Frequency Division Duplex (FDD) modes of operation within Long Term Evolution (LTE) cellular networks.

BACKGROUND

Communication systems may support wireless and wireline communications between wireless and/or wireline communication devices. Each type of communication system may be constructed/configured to operate in accordance with one or more communication standards. For instance, wireless communication systems may operate in accordance with one or more standards including, but not limited to, Radio Frequency Identification (RFID), Institute of Electrical and Electronic Engineers (IEEE) 802.11, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

A wireless communication device, such as a cellular telephone, two-way radio, personal digital assistant (PDA), personal computer (PC), laptop computer, home entertainment equipment, radio frequency identification (RFID) reader, RFID tag, etc. may communicate directly or indirectly with other wireless communication devices. For direct communications (also known as point-to-point communications), the participating wireless communication devices may tune their receivers and transmitters to the same channel(s) (e.g., one of the plurality of RF carriers of a wireless communication system or a particular RF frequency for some systems) and communicate over that channel(s). For indirect wireless communications, a wireless communication device may communicate directly with an associated BS (e.g., for cellular services) and/or an associated access point (AP) (e.g., for an in-home or in-building wireless network) via an assigned channel. The BS/AP may then relay the communication to another wireless communication device either directly or through additional base stations/access points, etc. To complete a communication connection between the wireless communication devices, the associated BSs and/or associated APs may communicate with each other directly, via a system controller, the public switch telephone network, the Internet, and/or some other wide area network.

To participate in wireless communications, each wireless communication device may include a built-in radio transceiver (i.e., receiver and transmitter), or may be coupled to an associated radio transceiver (e.g., a station for in-home and/or in-building wireless communication networks, RF modem, etc.). In most applications, radio transceivers are implemented in one or more integrated circuits (ICs), which can be inter-coupled via traces on a printed circuit board (PCB).

A transmitter aspect of the radio transceiver can include a data modulation stage, one or more intermediate frequency (IF) stages, and a power amplifier (PA). The data modulation stage can be configured to convert raw data into baseband signals in accordance with a particular wireless communication standard. The one or more intermediate frequency stages can be configured to mix the baseband signals with one or more local oscillations to produce RF signals. The PA can be configured to amplify the RF signals prior to transmission via an antenna.

A receiver aspect of the radio transceiver can be coupled to the antenna through an antenna interface and can include a low noise amplifier (LNA), one or more intermediate frequency stages, a filtering stage, and a data recovery stage. The LNA can be configured to receive inbound RF signals via the antenna and amplify them. The one or more IF stages can be configured to mix the amplified RF signals with one or more local oscillations to convert the amplified RF signal into baseband signals or IF signals. The filtering stage can be configured to filter the baseband signals or the IF signals to attenuate unwanted, out-of-band signals to produce filtered signals. The data recovery stage can then recover raw data from the filtered signals in accordance with the particular wireless communication standard.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Radio spectrum may be organized (and often) sold/auctioned as paired spectrum, where paired spectrum can refer to a block of the radio spectrum in a lower frequency band and an associated block of radio spectrum in an upper frequency band. This arrangement of frequency bands, i.e., pairs of frequency bands, allows one frequency band to be used for uplink (UL) communications, and one frequency band to be used for downlink (DL) communications—hence the term "paired spectrum." In particular, and in a frequency block, a number of frequency channels may be paired with associated frequency channels in another frequency block, where one frequency channel may transmit in one direction (e.g., downstream from a base station (BS) to a wireless communication device, also known as user equipment (UE), i.e., the DL channel). A second frequency channel may operate in the opposite direction (e.g., upstream from the UE to the BS, i.e., the UL channel). This pair of frequency channels may be separated by a duplex distance to isolate signals on the DL and UL channels. Such a technique may be referred to as Frequency Division Duplex (FDD).

Figure 1:
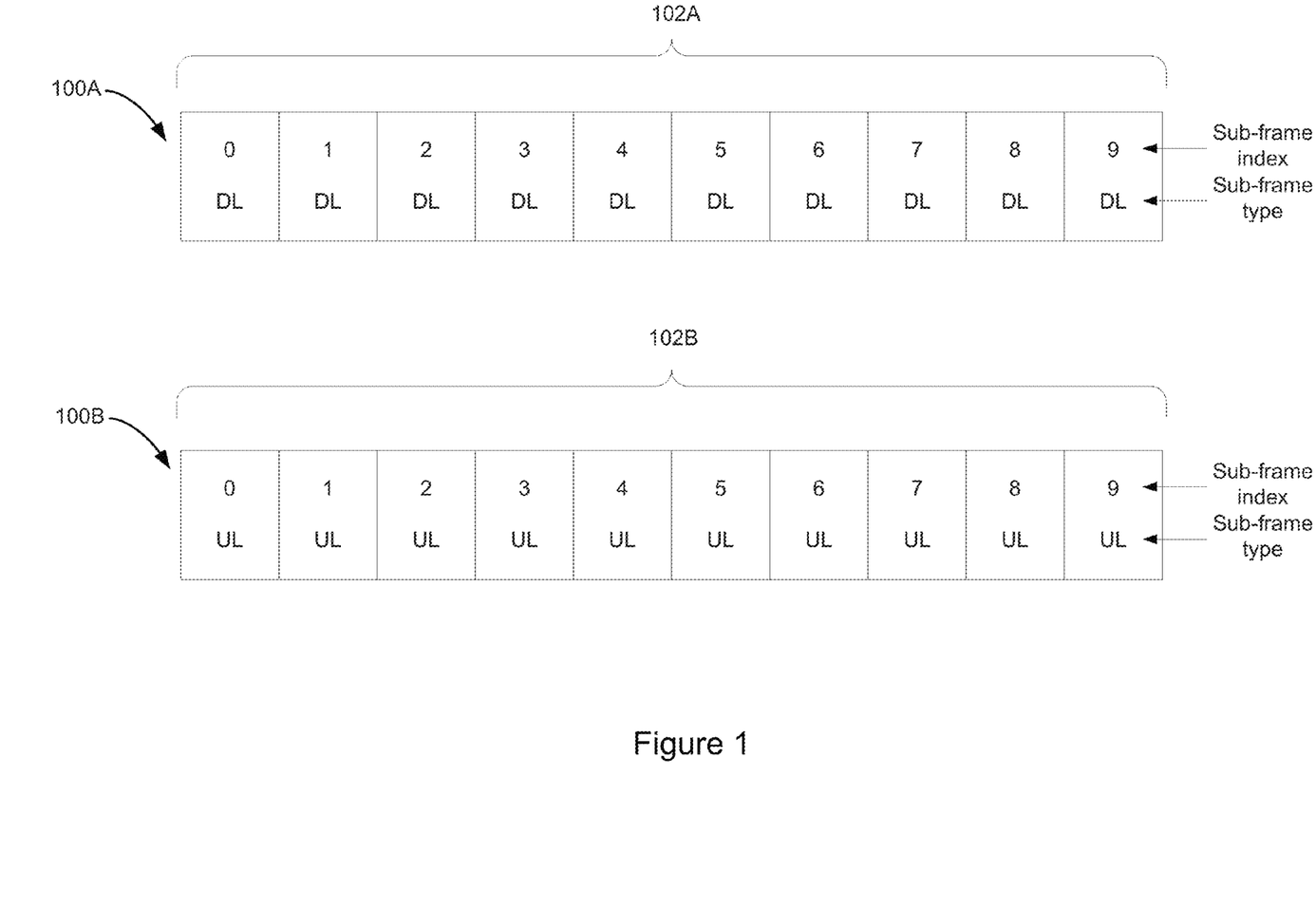
FIG. 1 illustrates an example FDD paired frequencies RF configuration.

FIG. 1 illustrates an example FDD paired frequencies RF configuration. As described above, FDD communications relies on two carrier frequencies (channels), e.g., a first paired frequency 100A and a second paired frequency 100B. The first paired frequency 100A may be dedicated as an FDD DL-only channel for DL transmissions, while the second paired frequency 100B may be dedicated as an FDD UL-only channel for UL transmissions. Within each (radio) frame (102A and 102B) of the paired frequencies 100A and 100B, respectively, there may be ten DL sub-frames (0-9 DL sub-frames) and ten UL sub-frames (0-9 UL sub-frames). Accordingly, UL and DL transmissions can occur simultaneously within a cell. In particular, each frame may be 10 ms, while each sub-frame may be divided into 2 slots of 0.5 ms each, where each slot may correspond with one or multiple resource block(s), which in turn may correspond to seven symbols. Isolation between UL and DL transmission may be achieved by, e.g., transmission/reception filters, and a sufficiently large duplex separation in the frequency domain.

However, and as a result of the diminishing availability of paired spectrum, another technique referred to as Time Division Duplex (TDD) may be used. In TDD, the UL and DL utilize the same frequency, where the UL and DL traffic are separated in time. That is, users may be assigned one or more time slots assigned for the UL and DL, respectively, making it possible to dynamically allocate more bandwidth to, e.g., downstream traffic, if need be.

Figure 2:
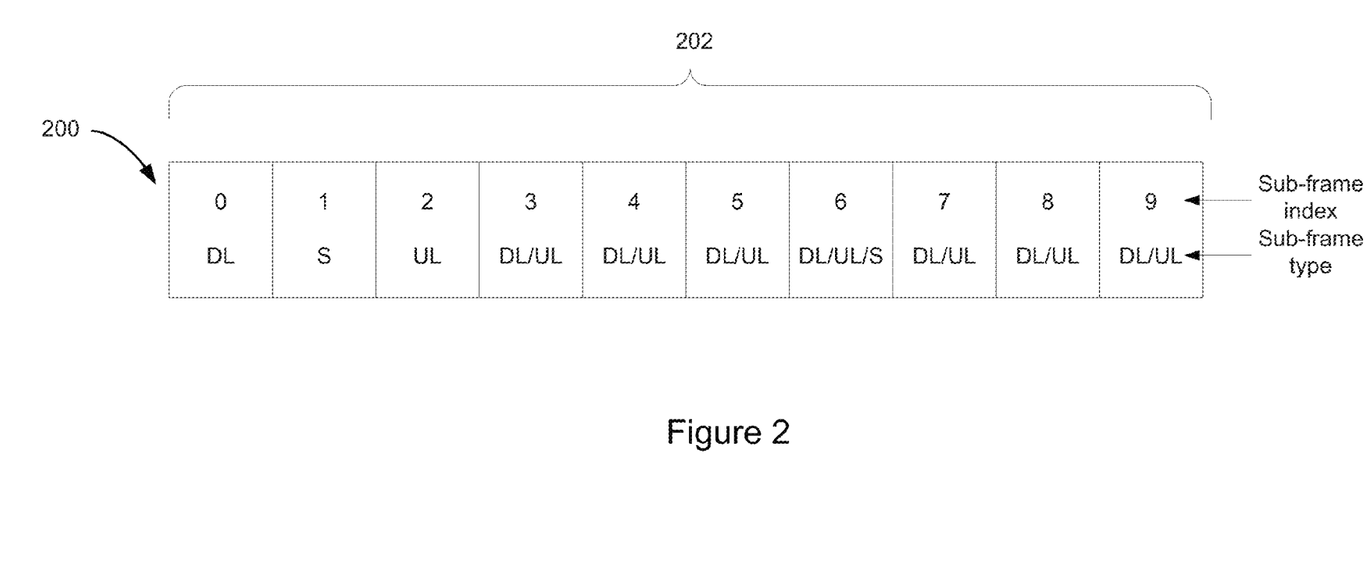
FIG. 2 illustrates an example TDD single frequency RF configuration.

FIG. 2 illustrates an example TDD single frequency RF configuration. As described above, TDD communications need only rely on a single carrier frequency (channel) which can be used for both DL and UL transmission that are alternating and non-overlapping in the time domain on a cell basis, e.g., TDD frequency/channel 200. Similar to frames in FDD, a frame 202 in TDD may include ten sub-frames (0-9). As illustrated in FIG. 2, some of the sub-frames 0-9 may be allocated for UL and some may be allocated for DL depending on a desired configuration. Sub-frames 1 and 6, in accordance with one example, may be "special" sub-frames reserved for switching between DL and UL transmissions.

In particular, a TDD frame, e.g., frame 202, may contain two "half" frames, where depending on the switch period, at least one of the half frames can contain the special sub-frame that carries switch information, e.g., DL Pilot Time Slot, Guard Period, and UL Pilot Time Slot information. If the switch time is 10 ms, the switch information may occur in a single special sub-frame, i.e., sub-frame 1. If the switch time is 5 ms, the switch information can occur both half frames, first in sub-frame 1, and again in sub-frame 6. Furthermore, FIG. 2 illustrates sub-frame 0 as being reserved for DL transmissions while sub-frame 2 is reserved for UL transmissions, with sub-frames 3-9 being configurable for DL or UL transmissions (and switching in the case of sub-frame 6 as previously indicated).

It should be noted that TDD communications may be implemented on an unpaired frequency/band, or alternatively, separately, in two paired frequencies/bands. Unlike FDD, which may utilize a duplex filter, as noted above, to implement sufficient separate between UL and DL transmissions, TDD UL and DL share the same frequency/band, which can lead to interference. In an uncoordinated deployment, UEs may have different timing, DL/UL allocation, and thus, the BS may require synchronization at the frame level within the same coverage area to avoid interference.

Long Term Evolution (LTE), a new generation radio interface promulgated by the $3^{rd}$ Generation Partnership Project (3GPP), may refer to a follow up and evolution of the 3GPP air interface, known as Universal Mobile Telecommunications System (UMTS) (evolved UMTS Terrestrial Radio Access (E-UTRA)), and its associated radio access network, known as the UMTS Terrestrial Radio Access Network (UTRAN). LTE can be associated with higher peak data rates with reduced latency, and may improve spectral efficiency. LTE may utilize Orthogonal Frequency Division Multiplexing (OFDM) on the DL to handle multipath routing and allow for scalable bandwidths. The UL can use a single carrier combined with Frequency Division Multiple Access (FDMA) technology to allow for power-efficient transmission of the UE, where bandwidth is variable to accommodate different data rates, and where users are separated through the use of a unique time interval on an assigned frequency. Frequency separation may also be utilized if, e.g., a UE has limited transmission power/insufficient data to transmit.

Figure 3:
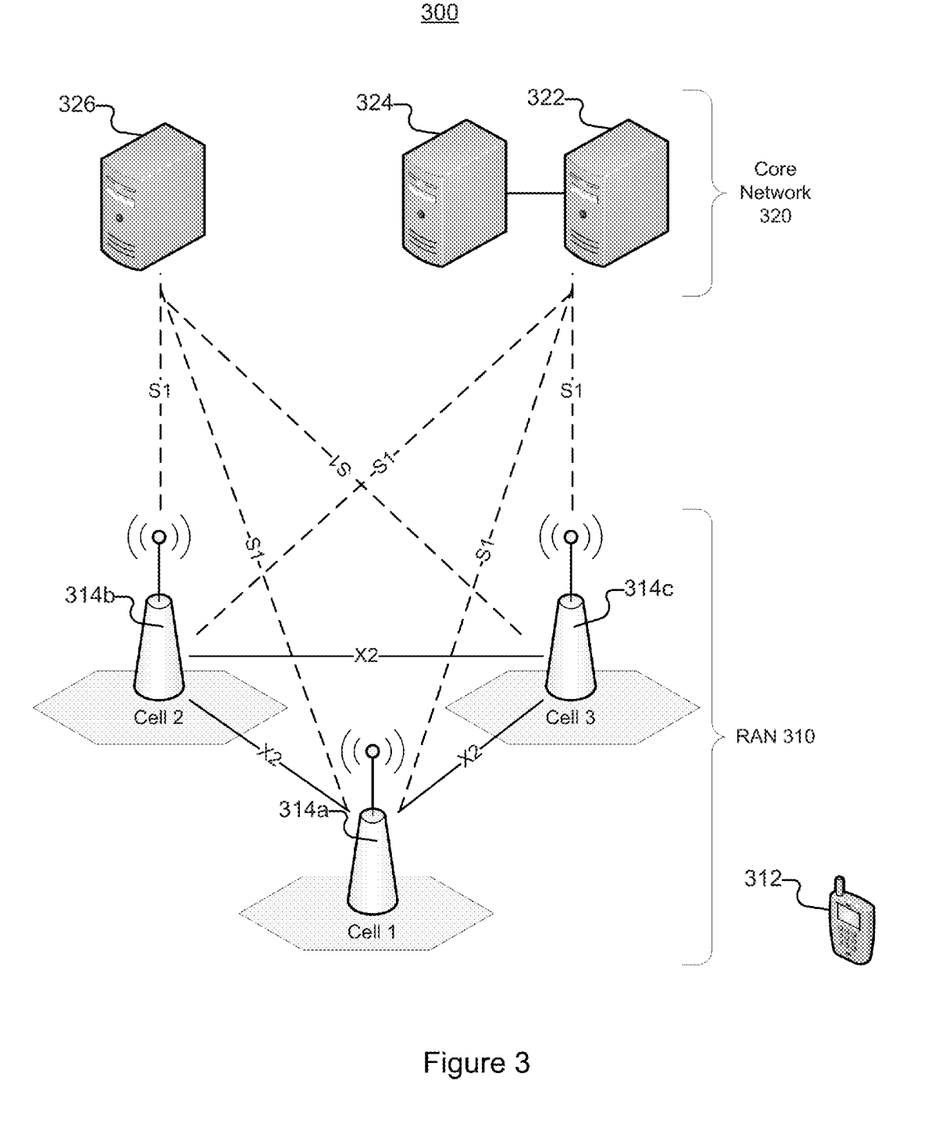
FIG. 3 illustrates an example communications network in which a duplexing method in accordance with various embodiments may be implemented.

FIG. 3 illustrates an example communications network 300 in which various methods and apparatuses may be utilized in accordance with various embodiments. Communications network 300 may be an example of the aforementioned LTE network or other type of wireless communications network, and may include a radio area network (RAN) 310 and a core network 320. The RAN 310 may support radio communications for UEs (such as UE 312) within its coverage area, and may be referred to as an E-UTRAN, as it may employ E-UTRA radio technology to communicate with one or more UEs over an air interface. The RAN 310 may also be in communication with the core network 320, where the core network 320 may support various services for the UE 312.

The RAN 310 may include one or more evolved Node Bs (eNBs), which may also be referred to as base stations, Node B's, access points, etc. FIG. 3 illustrates the RAN 310 as including eNBs 314a, 314b, and 314c. It should be noted that the RAN 310 may include any number of eNBs in accordance with various embodiments. The eNBs 314a, 314b, 314c may each include one or more transceivers for communicating with the UE 312 over the aforementioned air interface.

Each of the eNBs 314a, 314b, 314c may be associated with one or more cells (e.g., Cell 1, Cell 2, and Cell 3, respectively), and may be configured to handle radio resource management decisions, handover decisions/mobility management, scheduling of users in the UL and/or DL, etc. Communication between the eNBs 314a, 314b, and 314c may occur over an X2 interface.

The core network 320 may include various network entities, and may separate user plane and control plane traffic. In this example architecture, the core network 320, which may be referred to as an Evolved packet core (EPC), may be made up of control and user plane entities. A control plane entity referred to as a Mobility Management Entity (MME) may handle control plane traffic, while user plane traffic may be handled by a user plane entities referred to as a Serving Gateway (SGW) and a Packet Data Network (PDN) Gateway (PDN GW or PGW).

The core network 320 may facilitate communications with other networks. For example, the core network 320 may provide access (for the UE 312) to circuit-switched networks, such as the Public Switched Telephone Network (PSTN). The core network 320 may also facilitate communications between the UE 312 and land-line communications devices. For example, the core network 320 may include, or may communicate with, an Internet Protocol (IP) gateway, (e.g., an IP multimedia subsystem (IMS) server), that serves as an interface between the core network 320 and the PSTN. In addition, the core network 320 may provide the UE 312 with access to other networks, which may include other wired or wireless networks that are owned and/or operated by other service providers.

For simplicity, a single SGW 322, a single PGW 324, and one MME 326 are illustrated as being included in the core network 320. The SGW 322 may support data services such as packet data, Voice-over-Internet Protocol (VoIP) communications, video, messaging, etc., and may be connected to each of the eNBs 314a, 314b, and 314c in the RAN 310 via S1 interfaces. The SGW 322 may generally route and forward user data packets to/from the UE 312. The SGW 322 may also perform other functions, such as anchoring user planes during inter-eNB handovers, triggering paging when DL data is available for the UE 312, managing and storing contexts of the UE 312, etc.

A PGW (e.g., PGW 324) may be the interface between the LTE "subsystem" and IP networks, which may include, but are not limited to, the public Internet, and Internet Protocol Multimedia Subsystem (IMS) services that may be deployed within an operator core network.

An MME (e.g., MME 326) may be responsible for mobility management and path switching between eNBs at handover. The MME 326 may also perform paging for the core network 320. That is, and as illustrated in FIG. 3, the MME 326 may be connected to each of the eNBs 314a, 314b, and 314c in the RAN 310 via S1 interfaces, and may act as, alluded to above, a control node. For example, the MME 326 may be responsible for authenticating users of the UE 312, bearer activation/deactivation, selecting a particular SGW during an initial attach procedure of the UE 312, etc. The MME 326 may also provide a control plane function for switching between the RAN 310 and other RANs (not shown) that employ other radio technologies, such as the Global System for Mobile Communications (GSM) standard or the Wideband Code Division Multiple Access (WCDMA) standard. The SGW 322 may be connected to the PGW 324, which may provide the UE 312 with access to packet-switched networks, such as the aforementioned public Internet, to facilitate communications between the UE 312 and other IP-enabled devices.

While each of the foregoing elements are depicted as part of the core network 320, it will be appreciated that any one of these elements may be owned and/or operated by an entity other than the core network operator. Additionally, and in accordance with other embodiments, a pool of MMEs, a pool of PGWs, and a pool of SGWs may make up the core network 320, where an S1-flex mechanism may allow an eNB, such as eNBs 314a, 314b, and/or 314c to connect to the MME, PGW, and SGW pools for load balancing purposes.

It should be noted that the SGW 322 and the MME 326 may communicate with other entities, e.g., remote servers and terminals (not shown). Additionally, other wireless networks may include equivalent network entities. For example, a UTRAN supporting Wireless Code Division Multiple Access (WCDMA) may include the aforementioned node Bs (instead of eNBs) coupled to Radio Network Controllers (RNCs). A core network for UMTS may include Mobile Switching Centers (MSCs), Serving GPRS Support Nodes (SGSNs), and Gateway GPRS Support Nodes (GGSNs) (instead of SGWs and MMEs).

The UE 312 may communicate with one or more of the eNBs 314a, 314b, and 314c, as well as with the MME 326 and the SGW 322. The UE 312 may communicate with network entities (e.g., the eNBs 314a, 314b, and 314c) in the RAN 310 via lower layer signaling, and may communicate with network entities (e.g., the MME 326 and the SGW 322) in the core network 320 via upper layer signaling, e.g., Non Access Stratum (NAS) signaling in UMTS and LTE. The UE 312 may also be referred to as a mobile station, a terminal, an access terminal, a subscriber unit, a station, etc., and the UE 312 may be, e.g., a cellular phone, as described above, a personal digital assistant (PDA), a wireless modem, a wireless communication device, a handheld device, a laptop computer, a cordless phone, a wireless local loop (WLL) station, etc. The eNBs 314a, 314b, and 314c may broadcast system information (SI) via a broadcast channel to provide information within various SI types, each of which provides information required by UEs, (e.g., network information (mobile country code (MCC)/mobile network code (MNC) of a network), frequency synchronization parameters, and the like). SI may include the aforementioned NAS and Access Stratum (AS) SI.

Figure 4:
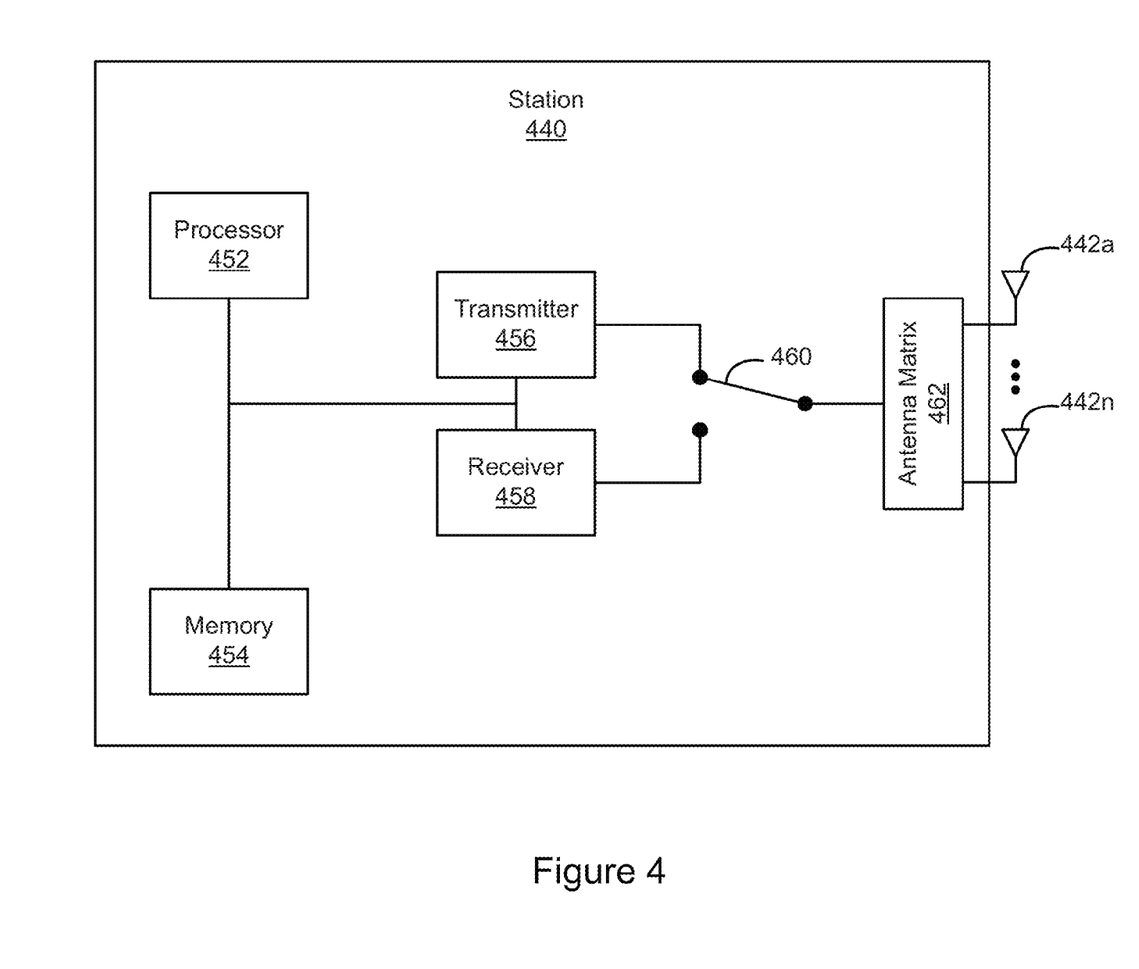
FIG. 4 is a block diagram of an example transceiver device which may be utilized in connection with various embodiments.

FIG. 4 is a block diagram of an example transceiver device, such as a MIMO transceiver, which may be utilized in connection with various embodiments of the present disclosure. Referring to FIG. 4, a wireless transceiver station 440 and a plurality of antennas 442a . . . 442n are shown. The example wireless transceiver station 440 may include a processor 452, a memory 454, a transmitter 456, a receiver 458, a transmit and receive (T/R) switch 460 and an antenna matrix 462 to which the plurality of antennas 442a . . . 442n are connected.

The wireless transceiver station 440 and its components may comprise suitable logic, circuitry, interfaces and/or code that may be operable to perform at the least the functions, operations and/or methods described herein. The wireless transceiver station 440 may be utilized at a BS or at a UE in a wireless communication system. In an exemplary 3GPP wireless communication system, the BS may be referred to as a node B (NB) (eNB in LTE) as alluded to previously.

The plurality of antennas 442a . . . 442n may enable the wireless transceiver station 440 to transmit and/or receive signals, for example RF signals, via a wireless communication medium. The wireless transceiver station 440 may also be depicted as comprising one or more transmitting antennas, which are coupled to the transmitter 456 and one or more receiving antennas, which may be coupled to the receiver 458 without loss of generality. The antenna matrix 462 may enable selection of one or more of the antennas 442a . . . 442n for transmitting and/or receiving signals at the wireless transceiver station 440. The T/R switch 460 may enable the antenna matrix 462 to be communicatively coupled to the transmitter 456 or receiver 458. When the T/R switch 460 enables communicative coupling between the transmitter 456 and the antenna matrix 462, the selected antennas 442a . . . 442n may be utilized for transmitting signals. When the T/R switch 460 enables communicative coupling between the receiver 458 and the antenna matrix 462, the selected antennas 442a . . . 442n may be utilized for receiving signals.

The transmitter 456 may enable the generation of signals, which may be transmitted via the selected antennas 442a . . . 442n. The transmitter 456 may generate signals by performing coding functions, signal modulation and/or signal modulation. In accordance with various embodiments of the present disclosure, the transmitter 456 may enable generation of signals using precoding and/or beamforming techniques.

As utilized herein, the term beamforming may refer generally to a method of signal processing that may allow a transmitting MIMO system, for example, to combine a plurality of spatial streams in a transmitted signal. Beamforming may also refer to a method for signal processing that may allow a receiving MIMO system to separate individual spatial streams in a received signal. That is, and with knowledge of channel state information (CSI), a BS can transmit signals from multiple antennas and have the transmission coherently combine at the UE.

The receiver 458 may enable the processing of signals received via the selected antennas 442a . . . 442n. The receiver 458 may generate data based on the received signals by performing signal amplification, signal demodulation and/or decoding functions. In accordance with various embodiments of the present disclosure, the receiver 458 may enable generation of data, which may be utilized by the transmitter 456 for precoding and/or beamforming of generated signals, as previously described.

The processor 452 may enable the generation of transmitted data and/or the processing of received data. The processor 452 may generate data, which is utilized by the transmitter 456 to generate signals. The processor 452 may further process data generated by the receiver 458. In accordance with various embodiments of the present disclosure, and in an NB/eNB, for example, the processor 452 may process data received by the receiver 458 and generate coefficient data, which may be utilized by the transmitter 456 for precoding and/or beamforming of generated signals. The coefficient data may be stored in the memory 454.

In a UE, the processor 452 may be operable to process data received by the receiver to generate beamforming data and/or CSI. The beamforming data and/or CSI may be stored in the memory 454. The beamforming data and/or CSI may also be sent to the transmitter 456 by the processor 452 or may be retrieved from the memory 454 by the transmitter 456. The transmitter 456 may utilize the beamforming data and/or CSI to generate signals, which are transmitted via the transmitting antennas 442a . . . 442n.

A channel estimate matrix for a DL RF channel may be used to describe a characteristic of the wireless transmission medium in the transmission path from the transmitter to the receiver. The channel estimate for an UL RF channel may describe a characteristic of the wireless transmission medium in the transmission path from the receiver to the transmitter. That is, CSI may refer to known channel properties of a communication link. Such information may describe how a signal propagates from the transmitter to the receiver, and may represent the effects of, e.g., scattering, fading, and power decay with distance. Use of CSI can allow the transmitter to adapt its transmissions to current channel conditions, thereby achieving, e.g., more reliable communication, higher data rates, etc. in wireless communication systems in which multi-antenna devices are communicating. In general, CSI may be estimated at the receiver, quantized, and fed back to the transmitter in FDD systems (or alternatively in TDD systems, CSI may be estimated using reverse-link estimation).

LTE systems can be based on either of the aforementioned communication modes, FDD or TDD. While FDD-LTE systems may be considered easier to implement, they can be considered to be inefficient in terms of effectively utilizing existing radio resources, particularly on the UL radio channel. Due to the asymmetry of DL and UL traffic (i.e., on the average, there can be much more demand for DL traffic as compared to UL traffic), valuable (and expensive) radio resources (i.e., radio spectrum) on the UL channel can be under-utilized.

On the other hand, TDD-LTE systems may be more difficult to implement as a result, of, e.g., certain requirements governing frequent switching between alternating DL and UL transmission modes. However, TDD-LTE systems can be very efficient in utilizing the radio resources, as the ratio of the DL and UL transmission allocations can be dynamically adjusted based on the demand for DL and UL traffic across a network.

In accordance with various embodiments, a duplexing method is provided which can combine aspects of FDD and TDD in a single system or configuration. Accordingly, radio spectrum may be more efficiently utilized by an operator, thereby potentially increasing revenue, as, e.g., an increase in DL radio resources on the order of 40-90% can result. Additionally, backward compatibility can be maintained for existing/legacy LTE solutions and products, as well as ease of implementation of the duplexing method in accordance with various embodiments. For example, little to no alternation(s) to existing operations may be required, as will be described in greater detail below.

Figure 5:
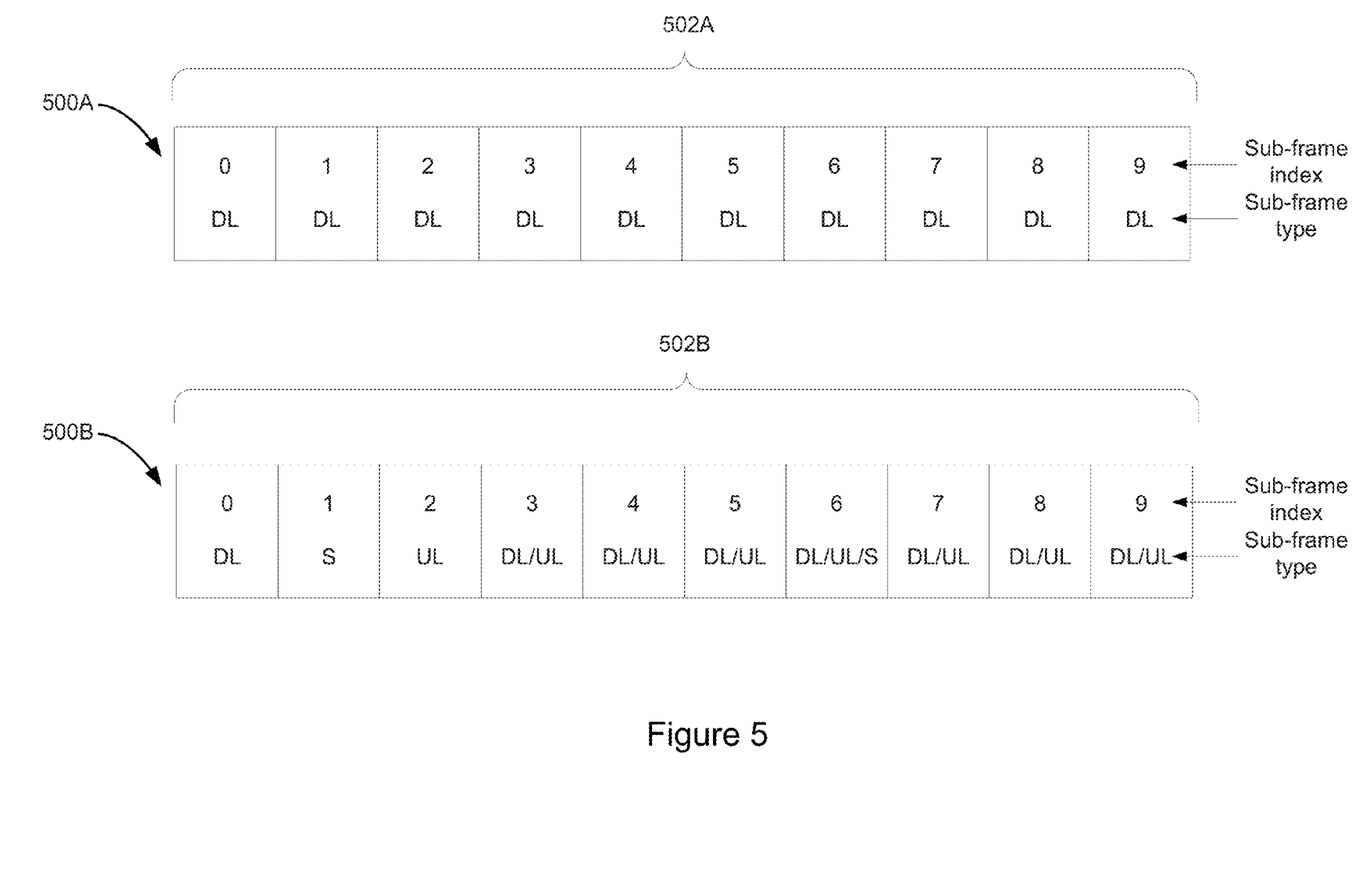
FIG. 5 illustrates an example implementation of the duplexing method in an FDD-LTE system in accordance with various embodiments.

To implement the duplexing method on an existing FDD-LTE system, in accordance with various embodiments, the radio channel which may be currently being utilized for FDD UL-only transmissions, may be configured to carry full TDD radio frames instead (i.e., the legacy FDD UL-only radio frame may be replaced with a full TDD radio frame). FIG. 5 illustrates an example implementation of the duplexing method in an FDD-LTE system having a first paired frequency 500A and a second paired frequency 500B, similar to the FDD paired frequencies RF configuration of FIG. 1. In accordance with various embodiments, a paired frequency of the existing FDD-LTE system, e.g., first paired frequency 500A over which an FDD DL-only radio frame 502A runs (similar to first paired frequency 100A and FDD DL-only radio frame 102A of FIG. 1), may be maintained. As previously described, the first paired frequency may be dedicated as an FDD DL-only channel for DL transmissions, where radio frame 502A may be divided into ten DL sub-frames (0-9 DL sub-frames). However, and instead of running a dedicated, FDD UL-only radio frame over a second paired frequency 500B, a full TDD radio frame, e.g., radio frame 502B (similar to radio frame 202 of FIG. 2), may be run over the second paired frequency 500B. Thus, a system configured with the duplexing method in accordance with various embodiments may include an FDD DL-only radio frame running over a first paired frequency, and a full TDD radio frame running over a second paired frequency.

Figure 6:
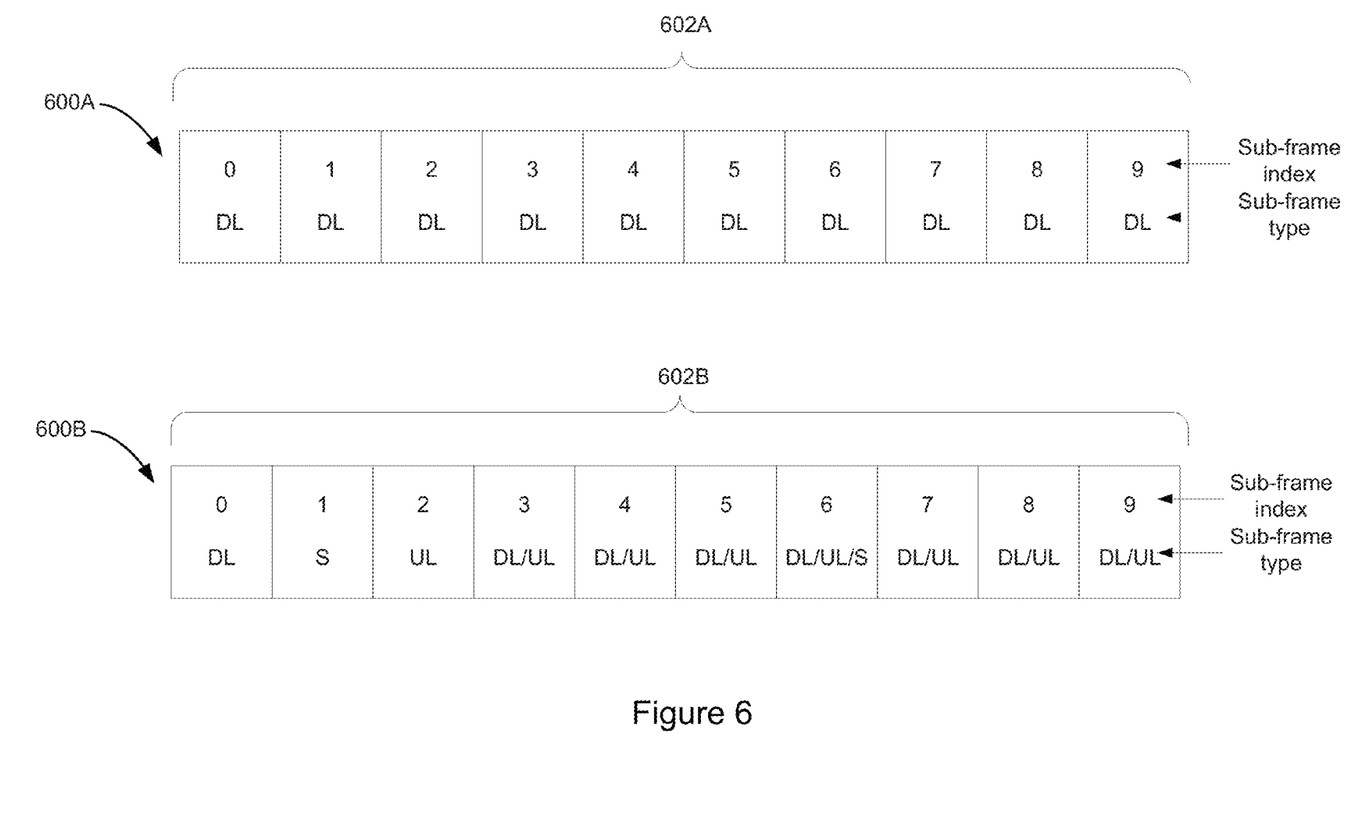
FIG. 6 illustrates an example implementation of the duplexing method in a TDD-LTE system in accordance with various embodiments.

Alternatively, the duplexing method may be implemented on an existing TDD-LTE system. To implement the duplexing method on an existing TDD-LTE system, an additional channel/frequency may be added to the existing TDD-LTE single frequency RF configuration. FIG. 6 illustrates an example implementation of the duplexing method in a TDD-LTE system, where an existing TDD frequency/channel 600B (similar to frequency/channel 200 of FIG. 2) on which a full TDD radio frame 602B may is running, may be maintained. The operator of the TDD-LTE system may add an extra channel, e.g., paired frequency 600A, on which an FDD DL-only radio frame can be run, e.g., FDD DL-only radio frame 602A. Similar to the resulting configuration of FIG. 5, paired frequencies can be provided over which a first paired frequency can run an FDD DL-only radio frame, while a second paired frequency can run a full TDD radio frame.

In either implementation, a UE may receive DL transmissions from a BS over a first frequency of a frequency pair. As described above, the first frequency of the frequency pair can be configured as a frequency division duplex (FDD) channel, such as an FDD DL-only channel having a plurality of DL-only sub-frames. Additionally, the UE may transmit UL transmissions to a BS over a second frequency of the frequency pair. As also described above, the second frequency of the frequency pair can be configured as a TDD channel over which a full TDD radio frame can be run, where the full TDD radio frame can be dynamically allocated with respect to UL and DL sub-frames.

The duplexing method in accordance with various embodiments can be an attractive strategy to, e.g., a TDD-LTE system operator who intends to license additional radio spectrum, where the additional radio spectrum can be dedicated as a DL-only channel. This "new" DL-only channel may implement a new full FDD DL-only radio frame on the new paired-frequency (referred to as the first paired frequency, while the existing TDD channel (referred to as the second paired frequency) can remain unchanged.

Moreover, and with respect to either of the above-mentioned implementations, an FDD-LTE system operator and a TDD-LTE system operator may operate a system having one radio frequency/channel, referred to as a first paired frequency, which can be used to carry FDD DL-only radio frames. The system may have another radio frequency/channel, referred to as a second paired frequency, which can be used to carry stand-alone, full TDD radio frames. Based on such a configuration, DL radio resources can be assigned to UEs over one or more of the following frequencies: over an FDD DL-only channel (first paired frequency); a full TDD channel (second paired frequency); and both the FDD DL-only channel and the full TDD channel (first and second paired frequencies). UL radio resources can be allocated over the UL sub-frames of the full TDD radio channel (second paired frequency).

As previously discussed, LTE systems often experience asymmetry with respect to DL and UL transmissions, i.e., there is often more demand for DL radio resources than for UL radio resources. In accordance with various embodiments, an LTE system operator has the advantage of being able to provide more DL radio resources to subscribers, while further having more flexibility to dynamically adjust the ratio of DL and UL transmissions (i.e., the ratio between the number of DL and UL sub-frames per radio frame) according to, e.g., instantaneous DL and UL traffic demand across the network. Accordingly, the duplexing method described herein presents a paradigm shift away from conventional, strict FDD/TDD-only LTE systems allowing for bandwidth (and power) optimization previously unavailable to the conventional, strict FDD/TDD-only LTE systems.

Further still, utilization of the duplexing method in accordance with various embodiments in a network can provide the ability to offer much higher capacity by serving a larger number of users at any given time, which can be referred to as capacity gain. The capacity gain realized through implementation of the duplexing method, can provide an operator with an additional source of recurring revenue by serving more users using existing radio resources. That is and for example, by employing the duplexing method in accordance with various embodiments, an FDD-LTE system operator now can utilize the UL frequency/channel to serve more users, which otherwise would be under-utilized through a conventional FDD UL-only channel. Further still, an operator can serve legacy FDD-only UEs, as well as legacy TDD-only UEs.

It should be noted that no hardware changes are needed for the existing/legacy UEs (i.e., Release 9 and Release 10 compliant) that may presently be on the market, although a minor software update/upgrade for legacy, FDD-only UEs in order to support a more advanced hybrid automatic repeat request (HARQ) mechanism may be implemented, as will be discussed in greater detail below. Existing TDD-only UEs do not require any hardware change or software upgrade to be able to operate on a network configured in accordance with the duplexing method of various embodiments. Moreover, it should be further noted that UEs capable of supporting the duplexing method described herein (and consequently, also capable of supporting the advanced HARQ mechanism alluded to previously), will be able to receive their DL traffic on any channel.

HARQ can refer to a combination of high-rate forward error-correcting coding and ARQ error-control, where original data can be encoded with a forward error correction (FEC) code, and parity bits are sent along with a new message (requested by receivers detecting a corrupted message). Alternatively, the parity bits may be sent upon request when the receivers detect the erroneous message.

The HARQ process as implemented in the TDD-LTE context can be different from that in the FDD-LTE context. In the case of FDD-LTE, for a transmission on sub-frame n, are acknowledgement/negative acknowledgement (ACK/NACK) message may be sent on sub-frame n+4. The 4 sub-frame delay in the transmission of the ACK/NACK message can be attributed a processing delay of approximately 3 ms at the receiver. If it is a NACK, the retransmission is scheduled on sub-frame n+8 for UL transmissions while the DL retransmission can be asynchronous.

In TDD-LTE, the time association between the data transmission and the transmission of the ACK/NACK message cannot be maintained due to the variable numbers of DL and sub-frames present in a radio frame as described previously). Therefore, the and DL delay between data transmission and ACK message transmission can be dependent on the allocation of UL and DL sub-frames in a TDD single RF configuration, and a fixed delay between a transmission and the HARQ ACK/NACK is not possible in TDD-LTE. In particular, the delay between the transmission of data and the HARQ ACK/NACK can depend on both the TDD configuration and the sub-frame in which the data was transmitted. In order to accommodate the various TDD configurations, a mapping/table indicative of a DL ACK/NACK timing index may be utilized (as specified in the LTE standard) to provide appropriate ACK/NACK delays in the DL and UL depending on what sub-frame the original data transmission occurred. For example, ACK/NACK message transmission delay in the DL may range from 4 sub-frames to 7 sub-frames, whereas ACK/NACK message transmission delay in the UL can range from 4 sub-frames to 13 sub-frames.

Similarly, and due to the increased DL capacity and the ability to dynamically allocate UL and DL sub-frames in a full TDD radio frame of the duplexing method described in the present disclosure in accordance with various embodiments, an advanced HARQ mechanism can be provided. In particular, the ACK/NACK messages/feedback for multiple DL sub-frames may be "combined" and transmitted on a next available UL sub-frame. To combine the ACK/NACK messages of multiple DL sub-frames, the ACK/NACK messages may be bundled or multiplexed. Bundling in the HARQ context can refer to performing, e.g., an AND operation on the separate ACK/NACK messages to be sent, and transmitting the AND'ed ACK/NACK messages, where multiplexing in the HARQ context can refer to separate ACK/NACK messages being sent (in the same sub-frame) for transmission in different sub-frames.

Figure 7:
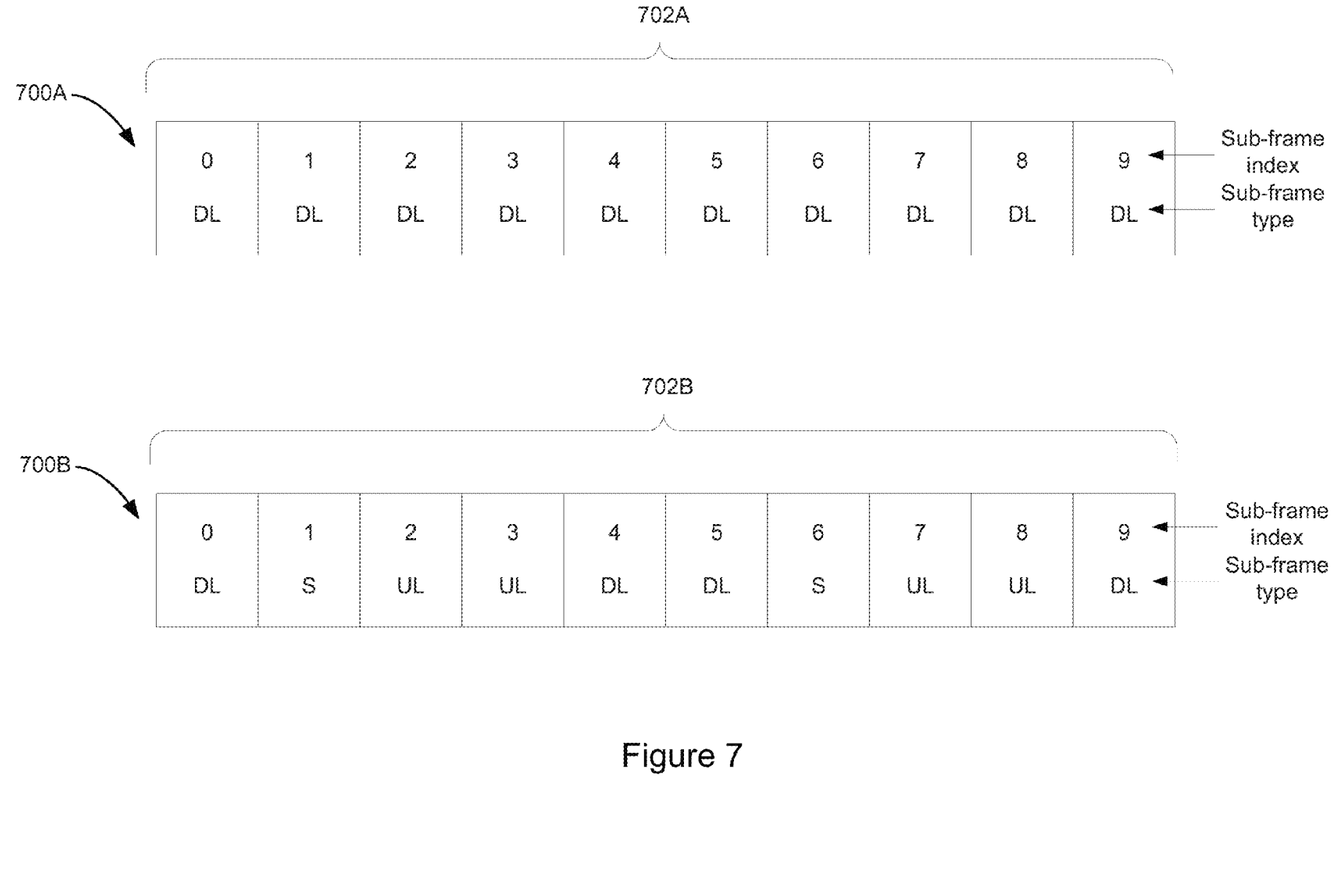
FIG. 7 illustrates an example configuration of DL and UL sub-frames in a system based on the duplexing method in accordance with various embodiments.

FIG. 7 illustrates an example configuration of DL and UL sub-frames in a system based on the duplexing method in accordance with one embodiment. An FDD DL-only radio frame 702A may run on a first paired frequency/channel 700A, while a full TDD radio frame 702B may run on a second paired frequency/channel 700B. The full TDD radio frame 702B may have sub-frames 0, 4, 5, and 9 configured as DL sub-frames, while sub-frames 2, 3, 7, and 8 may be configured as UL sub-frames. As previously described, the HARQ ACK/NACK messages of multiple DL sub-frames of the FDD DL-only radio frame 702A, can be combined through bundling or multiplexing in accordance with the advanced HARQ mechanism disclosed herein.

To implement the advanced HARQ mechanism in accordance with various embodiments, a more relaxed DL-to-UL sub-frame mapping between a group of sequential DL sub-frames on the FDD DL-only radio channel, and a next available UL sub-frame on the TDD channel (where bundled and/or multiplexed HARQ ACK/NACKs are to be transmitted) can be defined. As previously alluded to, a minor HARQ software upgrade may be performed for existing FDD-only UEs to comply with the more relaxed mapping, yet no hardware or software change is required for existing TDD-based UEs.

Alternatively, and even without an advanced HARQ software upgrade as described above, existing FDD-only UEs can be made to operate in accordance with the duplexing method presented herein by scheduling such FDD-only UEs on FDD DL-only sub-frames that are concurrent with DL sub-frames of the full TDD radio frame. That is, an FDD-only UE can still maintain sub-frame association pertaining to a given TDD configuration for the transmission of bundled/multiplexed ACK/NACKs. For example, and referring again to FIG. 7, FDD-only UEs can simply be kept from being scheduled on, e.g., sub-frames 2, 3, 7, or 8 of the FDD DL-only radio frame. Instead, FDD-only UEs may be scheduled on, e.g., sub-frames 4, 5, and 9 of the FDD DL-only radio frame 702A. In this way, any associated ACKs/NACKs may be transmitted based on existing mapping, e.g., the LTE standard-defined timing/mapping used for the DL sub-frames of the full TDD radio frame 702B (i.e., sub-frames 4, 5, and 9). Moreover, sub-frames 2, 3, 7, and 8 of the FDD DL-only radio frame 702A may be utilized to schedule UEs capable of supporting the duplexing method described herein.

The planned deployments of co-channel small cells (e.g. LTE-based picocells and femtocells) within macrocell coverage areas (to implement the often-referred to "LTE Heterogeneous Network" architecture and thereby maintain a Frequency Reuse of 1), have prompted investigation into a number of different methods for Inter-Cell Interference Coordination (ICIC).

That is, and in the context of a heterogeneous network with range expansion, for example, a picocell BS would need to perform control and data channel ICIC with dominant macro interferers in order for UEs to receive service from a lower-power BS that co-exists/is within the presence of a macrocellular BS. Moreover, UEs would need to support advanced receivers for interference cancellation. This is because macrocellular BSs may often have stronger DL signal strength. For femtocell BSs, only the owner or subscribers of the femtocell BS may be allowed to access the femtocell BS. For UEs that are close to these femtocell BSs, but are barred from accessing them, the interference caused by the femtocell BSs can be particularly severe, making it difficult to establish reliable DL communications to these UEs, thereby requiring more coordination via resource partitioning across BSs to manage inter-cell interference.

For example, and when a UE comes into close proximity to a co-channel small cell, the UEs that are served by an operator's macrocellular BS can experience a high level of interference on their DL channels, potentially affecting both control channel (PDCCH) and traffic channel (PDSCH) communications. This may be referred to as "Small Cell ICI." Further, given that these small co-channel cells are a source of interference to the macrocell DL, if they are also closed-access cells (a.k.a., Closed Subscriber Group (CSG)), such as the aforementioned femtocells, a coverage hole can effectively result in the macrocell area this is caused by such a CSG small cell.

As a result, ICIC is thought to be critical to heterogeneous network deployment, where one conventional ICIC technique may involve resource coordination amongst interfering BSs, where an interfering BS gives up use of some resources in order to enable control and data transmissions to a negatively impacted UE. More generally, interfering BSs may employ coordination between themselves with respect to transmission powers and/or spatial beams in order to enable control and data transmissions to their corresponding UEs.

Figure 8:
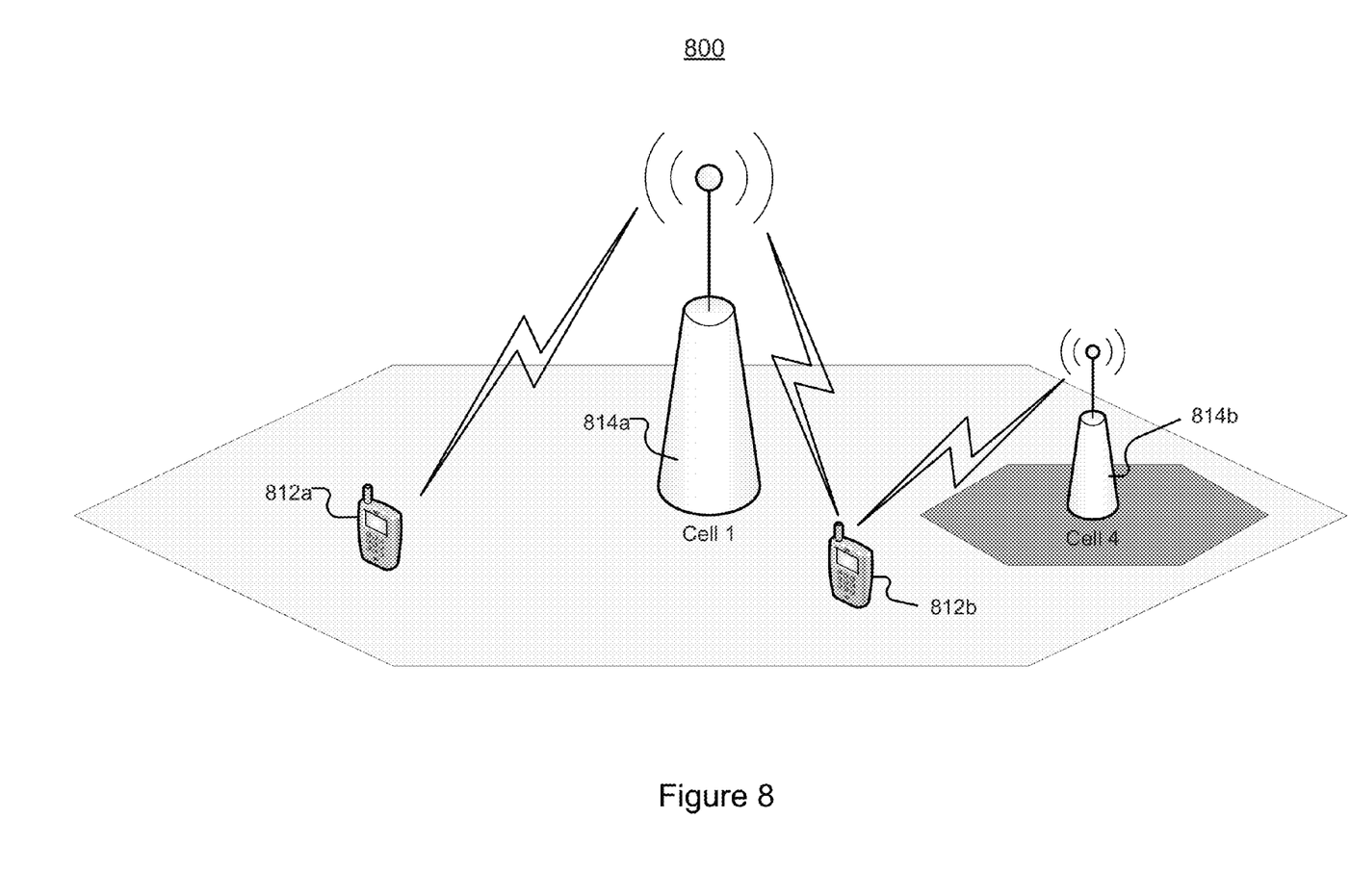
FIG. 8 illustrates an example heterogeneous network in which the duplexing method can be implemented in accordance with various embodiments.

FIG. 8 illustrates an example heterogeneous network 800 in which ICIC may be required. The heterogeneous network 800 may be made up of a macrocellular network that can include macocellular BS 814a (e.g., an eNB) that provides cellular service in a coverage area defined by cell 1. Also within the heterogeneous network 800 may be a small cell network that can include a co-channel, closed-access CSG small cell (i.e., cell 4) served by a small cell BS 814b (e.g., a femtocell BS). The macrocellular BS 814a can provide service to a first UE 812a and a second UE 812b. However, and because UE 812b is located proximate to cell 4, UE 812b is likely to experience severe ICI on its DL channel from the small cell BS 814b, affecting both control channel signaling and data transmission. In contrast, UE 812a is located far enough from cell 4 that it may not experience interference on its DL channels.

In accordance with various embodiments, and by virtue of the duplexing method disclosed herein, an operator can be provided with the capability to avoid ICI associated with co-channel, small cell CSG cells, such as cell 4. In particular, by utilizing the duplexing method in accordance with various embodiments, UEs that may be located near co-channel, closed-access CSG cells may be instructed by the macrocellular BS to receive their DL traffic only on the FDD DL-only channel (i.e., the first paired frequency), while UEs that are located further away from co-channel, closed-access CSG cells may be assigned to receive their DL traffic either on the FDD DL-only channel (i.e., the first paired frequency), or on the TDD channel (i.e., the second paired frequency), or alternatively still, on both the first and second paired frequencies.

Referring again to FIG. 8, if the macrocellular network portion of the heterogeneous network 800 utilizes the duplexing method in accordance with various embodiments, UE 812a may utilize any/all of the possible channels, i.e., the first and second paired frequencies, (such as 500A and 500B of FIG. 5) for DL traffic. Even though the small cell network may rely on a co-channel, closed-access CSG small cell, cell 4, that may operate in, e.g., TDD-LTE mode, (thereby sharing the second paired frequency with cell 1), because UE 812a is located far enough from cell 4, it does not experience any DL ICI. In the case of UE 812b, it can be configured to receive DL traffic only through the first paired frequency, thereby also avoiding DL ICI as cell 1 does not share the first paired frequency with cell 4.

By being able to completely avoid co-channel interference from closed-access small cells, a UE may continue receiving service from a macrocell over a small cell coverage area, thereby avoiding coverage-holes created by such co-channel closed-access small cells. Given the scattered (ad-hoc) deployment of closed-access CSG small cells, this method of co-channel interference avoidance provides additional incentive for a service provider to implement the duplexing method described herein. Also and again, the duplexing method in accordance with various embodiments requires neither hardware nor software changes in existing and future commercial small cells or commercial LTE UEs.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus, comprising:
    a processor; and
    a memory including computer program code, the memory and the computer program code configured to, with the processor, cause the apparatus to perform at least the following:
        receive downlink (DL) transmissions and send uplink (UL) transmissions via paired frequencies, the paired frequencies comprising a frequency division duplex (FDD) channel for transmission of DL-only radio frames, and a time division duplex (TDD) channel for UL and DL transmissions; and
        transmit hybrid automatic repeat request (HARQ) acknowledgement (ACK) and/or negative ACK (NACK) messages associated with a plurality of DL sub-frames comprising a group of sequential DL sub-frames on a single next available UL sub-frame occurring on the TDD channel, the next available UL sub-frame indicated in a DL to UL sub-frame mapping between the plurality of DL sub-frames on a FDD DL-only radio frame and the next single available UL sub-frame,
wherein radio frames transmitted in the TDD channel are characterized by variable numbers of UL and DL sub-frames, and wherein the single next available UL sub-frame is determined according to UL sub-frames allocated to a corresponding radio frame.

2. An apparatus, comprising:
a processor; and
a memory including computer program code, the memory and the computer program code configured to, with the processor, cause the apparatus to perform at least the following:
receive downlink (DL) transmissions and send uplink (UL) transmissions via paired frequencies, the paired frequencies comprising a frequency division duplex (FDD) channel for transmission of DL-only radio frames, and a time division duplex (TDD) channel for UL and DL transmissions; and
transmit hybrid automatic repeat request (HARQ) acknowledgement (ACK) and/or negative ACK (NACK) messages associated with a plurality of DL sub-frames comprising a group of sequential DL sub-frames on a single next available UL sub-frame occurring on the TDD channel, the next available UL sub-frame indicated in a DL to UL sub-frame mapping between the plurality of DL sub-frames on a FDD DL-only radio frame and the next single available UL sub-frame,
wherein transmissions of HARQ ACK and/or NACK messages on DL sub-frames of the TDD channel are only scheduled on DL sub-frames specified in at least one existing DL to UL sub-frame mapping.

3. The apparatus of claim 1, wherein the memory and the computer program code are configured to, with the processor, cause the apparatus to perform an AND operation on at least some of the HARQ ACK and/or NACK messages.

4. The apparatus of claim 3, wherein the HARQ ACK and NACK messages are bundled or multiplexed.

5. The apparatus of claim 1, wherein the plurality of DL sub-frames comprises the group of sequential DL sub-frames on the FDD DL-only radio frame.

6. The apparatus of claim 1, wherein the apparatus is scheduled on one of the plurality of DL sub-frames that is concurrent with a DL sub-frame of a full TDD radio frame running over the TDD channel if the apparatus supports only FDD-Long Term Evolution (LTE) communications.

7. The apparatus of claim 1, wherein a full TDD radio frame runs over the TDD channel.

8. The apparatus of claim 7, wherein the full TDD radio frame comprises dynamically allocable UL and DL sub-frames.

9. A method, comprising:
receiving downlink (DL) transmissions from a base station over a first frequency of a frequency pair, the first frequency being configured as a frequency division duplex (FDD) channel for transmission of DL-only radio frames;
transmitting uplink (UL) transmissions to the base station over a second frequency of the frequency pair, the second frequency being configured as a time division duplex (TDD) channel for UL and DL transmissions; and
transmitting hybrid automatic repeat request (HARQ) acknowledgement (ACK) and/or negative ACK (NACK) messages associated with a plurality of DL sub-frames comprising a group of sequential DL sub-frames on a single next available UL sub-frame on the TDD channel, the single next available UL sub-frame indicated in a DL to UL sub-frame mapping between the plurality of DL sub-frames on a FDD DL-only radio frame and the next available UL sub-frame,
wherein radio frames transmitted in the TDD channel are characterized by variable numbers of UL and DL sub-frames, and wherein the single next available UL sub-frame is determined according to UL sub-frames allocated to a corresponding radio frame.

10. The method of claim 9, wherein the FDD channel supports FDD DL-only radio frames.

11. The method of claim 9, wherein the TDD channel supports full TDD radio frames.

12. The method of claim 11, wherein the full TDD radio frames comprise dynamically allocable UL and DL sub-frames.

13. The method of claim 9, wherein the base station comprises a Long Term Evolution (LTE) evolved Node B (eNB).

14. A system, comprising:
a macrocell base station configured to provide service over a first cell;
and a small cell base station providing service over a second cell; and
first and second user equipment (UE) configured to receive service from the macrocell base station, the first UE being located distant from the second cell and the second UE being located proximate to the second cell, wherein the first UE receives downlink (DL) traffic on at least one of a first and second frequency of a frequency pair, the first frequency being configured as a frequency division duplex (FDD) channel for transmission of DL-only radio frames, and the second frequency being configured as a time division duplex (TDD) channel for UL and DL transmissions, and wherein the second UE receives DL traffic on the first frequency, the first UE configured to transmit hybrid automatic repeat request (HARQ) acknowledgement (ACK) and/or negative ACK (NACK) messages associated with a plurality of DL sub-frames comprising a group of sequential DL sub-frames on a single next available UL sub-frame on the TDD channel, the single next available UL sub-frame indicated in a DL to UL sub-frame mapping between the plurality of DL sub-frames on a FDD DL-only radio frame and the next available UL sub-frame,
wherein radio frames transmitted in the TDD channel are characterized by variable numbers of UL and DL sub-frames, and wherein the single next available UL sub-frame is determined according to UL sub-frames allocated to a corresponding radio frame.

15. The system of claim 14, wherein the FDD DL-only radio frame runs over the FDD channel.

16. The system of claim 14, wherein the FDD DL-only radio frame comprises a plurality of dedicated sub-frames for DL transmissions.

17. The system of claim 14, wherein a full TDD radio frame runs over the TDD channel.

18. The system of claim 17, wherein the full TDD radio frame comprises a dedicated UL sub-frame, a dedicated DL sub-frame, at least one special sub-frame dedicated to switching between DL and UL transmissions, and a plurality of dynamically allocable UL and DL sub-frames.

19. The system of claim 17, wherein the second cell comprises a co-channel, closed-access small cell configured to share the second frequency of the frequency pair with the first cell.

20. A method, comprising:
- receiving downlink (DL) transmissions from a base station over a first frequency of a frequency pair, the first frequency being configured as a frequency division duplex (FDD) channel for transmission of DL-only radio frames;
- transmitting uplink (UL) transmissions to the base station over a second frequency of the frequency pair, the second frequency being configured as a time division duplex (TDD) channel for UL and DL transmissions; and
- transmitting hybrid automatic repeat request (HARQ) acknowledgement (ACK) and/or negative ACK (NACK) messages associated with a plurality of DL sub-frames comprising a group of sequential DL sub-frames on a single next available UL sub-frame on the TDD channel, the single next available UL sub-frame indicated in a DL to UL sub-frame mapping between the plurality of DL sub-frames on a FDD DL-only radio frame and the next available UL sub-frame,
- wherein transmissions of HARQ ACK and/or NACK messages on DL sub-frames of the TDD channel are only scheduled on DL sub-frames specified in at least one existing DL to UL sub-frame mapping.

* * * * *